US008616784B2

(12) United States Patent
Saito et al.

(10) Patent No.: US 8,616,784 B2
(45) Date of Patent: Dec. 31, 2013

(54) OPTICAL CONNECTOR WITH A SCREW PORTION AND METHOD OF ASSEMBLING THE OPTICAL CONNECTOR

(75) Inventors: Daigo Saito, Sakura (JP); Kazuhiro Takizawa, Sakura (JP); Serin Khee Yen Tan, Sakura (JP)

(73) Assignee: Fujikura Ltd., Tokyo (JP)

( * ) Notice: Subject to any disclaimer, the term of this patent is extended or adjusted under 35 U.S.C. 154(b) by 137 days.

(21) Appl. No.: 12/985,704

(22) Filed: Jan. 6, 2011

(65) Prior Publication Data

US 2011/0097044 A1 Apr. 28, 2011

Related U.S. Application Data

(63) Continuation of application No. PCT/JP2009/050204, filed on Jan. 9, 2009.

(30) Foreign Application Priority Data

Jul. 10, 2008 (JP) ................................. 2008-180694

(51) Int. Cl.
*G02B 6/26* (2006.01)
*G02B 6/36* (2006.01)

(52) U.S. Cl.
USPC ............................................. 385/83; 385/86

(58) Field of Classification Search
USPC ........ 385/86, 87, 88, 138, 139, 147; 264/1.25
See application file for complete search history.

(56) References Cited

U.S. PATENT DOCUMENTS

| | | | |
|---|---|---|---|
| 5,062,683 A | 11/1991 | Grois et al. | |
| 5,644,673 A * | 7/1997 | Patterson | 385/138 |
| 6,206,581 B1 | 3/2001 | Driscoll et al. | |
| 7,241,056 B1 | 7/2007 | Kuffel et al. | |
| 2005/0244108 A1 | 11/2005 | Billman et al. | |

FOREIGN PATENT DOCUMENTS

| | | |
|---|---|---|
| JP | 57-48706 A | 3/1982 |
| JP | 2-7612 U | 1/1990 |
| JP | 10-206687 A | 8/1998 |
| JP | 2007-187724 A | 7/2007 |

OTHER PUBLICATIONS

Daigo Saito et al., "Hikari Fiber Cord-yo Genba Kumitate Hikari Connector Field Installable Optical Connector for Cable", Nen The Institute of Electronics, Mar. 5, 2008, Information and Communication Engineers Sogo Taikai Koen Ronbunshu Tsushin 2, p. 301, B-10-18.

Extended European Search Report for counterpart European Patent Application No. 09794219.7 dated Nov. 4, 2013.

* cited by examiner

*Primary Examiner* — Akm Enayet Ullah
(74) *Attorney, Agent, or Firm* — Sughrue Mion, PLLC

(57) ABSTRACT

An optical connector that is assembled onto a terminal of an optical fiber cable including tension bodies. The optical connector includes a housing, a ferrule that is provided in the housing, and a fixing cap that is mounted on the housing. The housing includes a fixing portion of which an outer peripheral surface is provided with a screw portion. While the tension bodies leading from the terminal of the optical fiber cable are interposed between the housing and the fixing cap, the fixing cap is screwed onto and fixed to the fixing portion.

15 Claims, 20 Drawing Sheets

OPTICAL CONNECTOR WITH A SCREW PORTION AND METHOD OF ASSEMBLING THE OPTICAL CONNECTOR

CROSS-REFERENCE TO RELATED APPLICATION

This is a Continuation Application of International Application No. PCT/JP2009/050204, filed on Jan. 9, 2009, which claims priority to Japanese Patent Application No. 2008-180694, filed on Jul. 10, 2008. The contents of the aforementioned applications are incorporated herein by reference.

TECHNICAL FIELD

The present invention relates to an optical connector, and more particularly, to a site assembly-type optical connector that can be assembled without using a dedicated tool in a site other than a factory, and a method of assembling the optical connector.

BACKGROUND ART

As an optical connector that is assembled onto a tip of an optical fiber cable (for example, an optical cord) including tension fibers, there is an optical connector having a structure for retaining tension fibers.

As a retaining structure, there is, for example, a structure for caulking and fixing tension fibers to a stop ring using a caulking member (see Patent Documents 1 and 2).

In the caulking fixing structure, the caulking member is fixed by a dedicated tool.

[Patent Document 1] Japanese Unexamined Patent Application, First Publication No. H10-206687

[Patent Document 2] Specification of U.S. Pat. No. 6,206,581

DISCLOSURE OF THE INVENTION

Problem that the Invention is to Solve

However, since a dedicated tool is needed in the optical connector, an assembling operation is troublesome and there is a demand for an easier operation.

Further, in a general-purpose caulking fixing structure, it is difficult to detach a caulking member once it has been fixed. Accordingly, if tension bodies are insufficiently fixed for any reason, an operation for fixing a new caulking member to a new terminal needs to be performed after a caulked portion is released by the removal of a portion of the optical fiber where the caulking member is fixed. For this reason, there has been a problem in terms of assembly yield of the optical connector.

The present invention has been made in consideration of the above-mentioned circumstances, and an object of the present invention is to provide an optical connector that is easily assembled and is excellent in terms of assembly yield, and a method of assembling the optical connector.

Means for Solving the Problem

According to the present invention, there is provided an optical connector that is assembled onto a terminal of an optical fiber cable where an optical fiber and tension bodies extending in a longitudinal direction of the optical fiber are integrated. The optical connector includes a housing, a ferrule that is provided in the housing, and a fixing cap that is mounted on the housing. The housing includes a fixing portion of which an outer peripheral surface is provided with a screw portion. While the tension bodies leading from the terminal of the optical fiber cable are interposed between the housing and the fixing cap, the fixing cap can be screwed onto and fixed to the fixing portion.

In the optical connector according to the present invention, a built-in optical fiber inserted into the ferrule may be connected to the optical fiber exposed to the terminal of the optical fiber cable.

In the optical connector according to the present invention, one or a plurality of groove portions for receiving the tension bodies may be formed on the outer peripheral surface of the fixing portion.

In the optical connector according to the present invention, the plurality of groove portions may be formed, and the groove portions may be formed at positions that are rotationally symmetrical to each other with respect to an insertion direction of the optical fiber.

In the optical connector according to the present invention, the screw portion may be formed on the outer peripheral surface of the fixing portion over an entire circumference of the fixing portion.

In the optical connector according to the present invention, a retaining ring, which retains the tension bodies on the housing before a screwing on of the fixing cap, may be mounted on the housing and the retaining ring may retain the tension bodies by interposing the tension bodies between the retaining ring and the housing.

In the optical connector according to the present invention, the housing may include an extended cylindrical portion that is thinner than the fixing portion and extends rearward from the fixing portion, and the retaining ring may retain the tension bodies by interposing the tension bodies between the retaining ring and the extended cylindrical portion.

In the optical connector according to the present invention, a protective tube may be fixed to a jacket of the optical fiber cable. The protective tube may include a cylindrical tube main body and a locking protrusion that extends outward from the tube main body. The locking protrusion may be formed so as to be locked to a locking stepped portion formed on an inner surface of the fixing cap and prevent a rearward movement of the protective tube.

In the optical connector according to the present invention, the tension bodies may be fixed to positions, which are distant from each other in a circumferential direction of the housing, while being divided into a plurality of aggregates.

According to the present invention, there is provided an optical connector that is assembled onto a terminal of an optical fiber cable where an optical fiber and tension bodies extending in a longitudinal direction of the optical fiber are integrated. The optical connector includes a fixing portion which is formed at a rear end of a connector body and of which an outer peripheral surface is provided with a screw portion. A fixing cap can be screwed and fixed to the fixing portion. While the tension bodies leading from the terminal of the optical fiber cable are interposed between the connector body and the fixing cap, the fixing cap can be screwed onto and fixed to the fixing portion.

According to the present invention, there is provided a method of assembling an optical connector onto a terminal of an optical fiber cable where an optical fiber and tension bodies extending in a longitudinal direction of the optical fiber are integrated. The method includes: abutting and connecting the optical fiber exposed to the terminal of the optical fiber cable to a built-in optical fiber inserted into a ferrule that is provided in an optical connector housing, the optical connector housing comprising a fixing portion, the fixing portion having an outer peripheral surface with a screw portion; and screwing and fixing a fixing cap to the fixing portion, while interposing the tension bodies leading from the terminal of the optical fiber cable between the optical connector housing and the fixing cap, after the abutting and connecting of the optical fibers.

In the method according to the present invention, the tension bodies may be retained by a retaining ring before the screwing on of the fixing cap, while being interposed between the housing and the fixing cap.

In the method according to the present invention, the tension bodies are disposed at positions, which are distant from each other in a circumferential direction of the housing, before the screwing on of the fixing cap, while being divided into a plurality of aggregates.

According to the present invention, there is provided a method of assembling an optical connector onto a terminal of an optical fiber cable where an optical fiber and tension bodies extending in a longitudinal direction of the optical fiber are integrated. The method includes screwing and fixing a fixing cap to an optical connector fixing portion, which is formed at a rear end of a connector body and which has an outer peripheral surface provided with a screw portion, while interposing the tension bodies leading from the terminal of the optical fiber cable between an optical connector connector body and the fixing cap.

In the method according to the present invention, the tension bodies are disposed at positions, which are distant from each other in a circumferential direction of the housing, before the screwing on of the fixing cap, while being divided into a plurality of aggregates.

Effects of the Invention

The optical connector according to the present invention has a structure where the fixing cap is screwed onto the fixing portion so as to fix the tension bodies. A dedicated tool is needed in a general-purpose caulking fixing structure. However, since screwing has been employed in the present invention, a dedicated tool is not needed. Therefore, the optical connector is easily assembled.

Further, since screw fixing is employed, it may be possible to firmly fix the tension bodies to the housing and provide sufficient strength to a connection portion connected to the optical fiber cable.

Furthermore, since the number of parts of a fixing structure is small in the optical connector according to the present invention and the structure of the optical connector is simple, it may be possible to reduce the number of assembling processes. Since the structure of the optical connector is simple, it may be possible to reduce the size of the optical connector, that is, to reduce the entire length of the optical connector.

In the general-purpose caulking fixing structure, it is difficult to detach a caulking member once it has been fixed. Accordingly, if the tension bodies are insufficiently fixed due to an incorrect operation or the like, an operation for fixing a caulking member to a new terminal needs to be performed after the removal of a portion of the optical fiber where the caulking member is fixed.

In contrast, screwing is employed in the optical connector according to the present invention. Accordingly, if the tension bodies are insufficiently fixed due to an incorrect operation or the like, it may be possible to mount the fixing cap again after separating the fixing cap. Therefore, the yield of the assembling of the optical connector becomes high.

Figure 1:
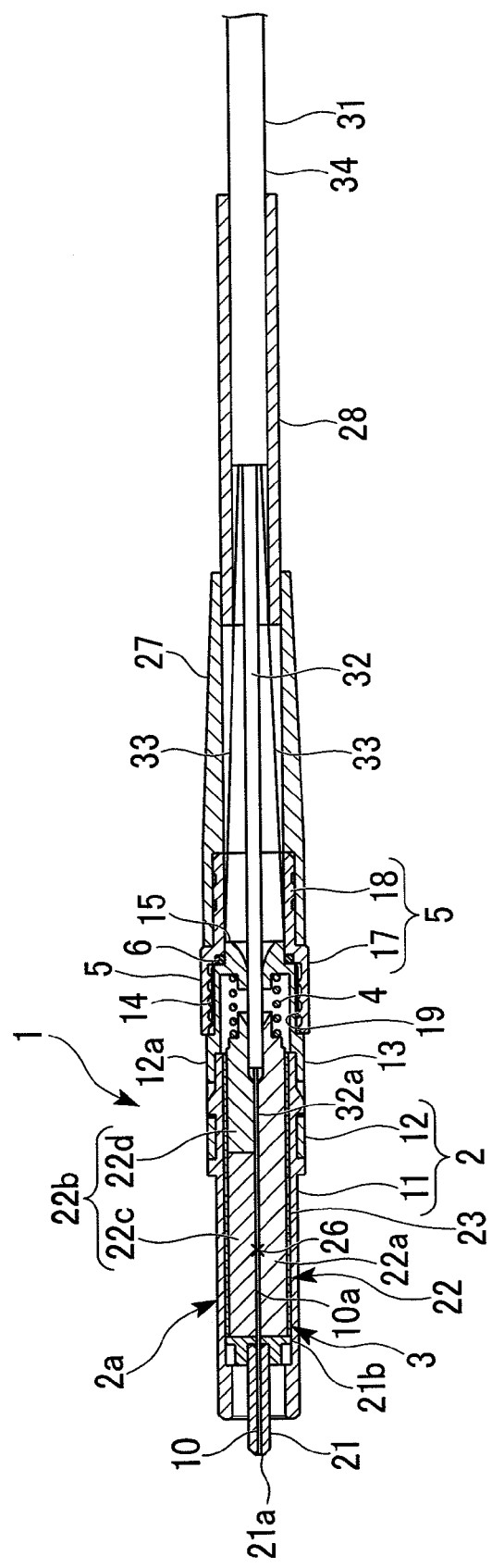
FIG. 1 is a sectional view of an optical connector according to an embodiment of the present invention.

DESCRIPTION OF REFERENCE NUMERALS AND SIGNS 1, 41 optical connector
2 housing
5, 42 fixing cap
6 retaining ring
14 fixing portion
15 extended cylindrical portion
16 screw portion
25 groove portion
31 optical fiber cable
32 optical fiber
33 tension body
34 jacket
43 protective tube
51 locking stepped portion
54 tube main body
55 flange portion (locking protrusion)

BEST MODE FOR CARRYING OUT THE INVENTION

A first embodiment of the present invention will be described below with reference to the drawings.

Figure 2:
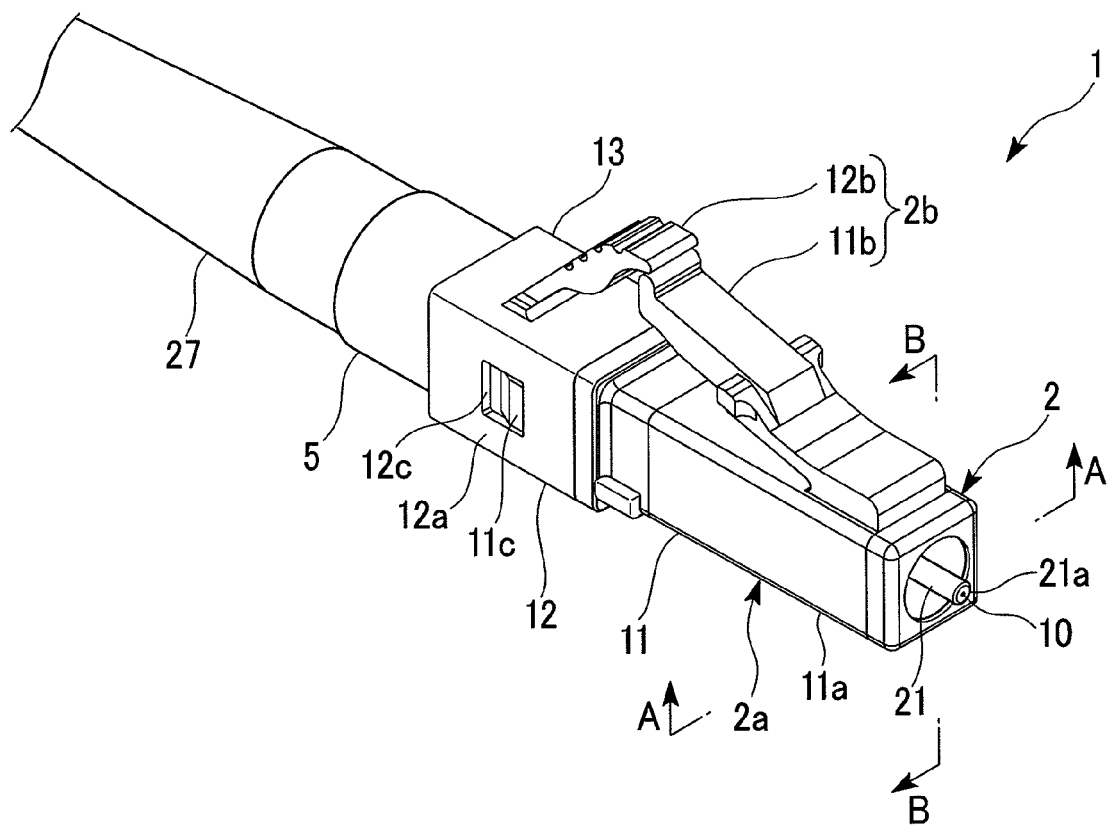
FIG. 2 is a perspective view showing the appearance of the optical connector shown in FIG. 1.
Figure 3:
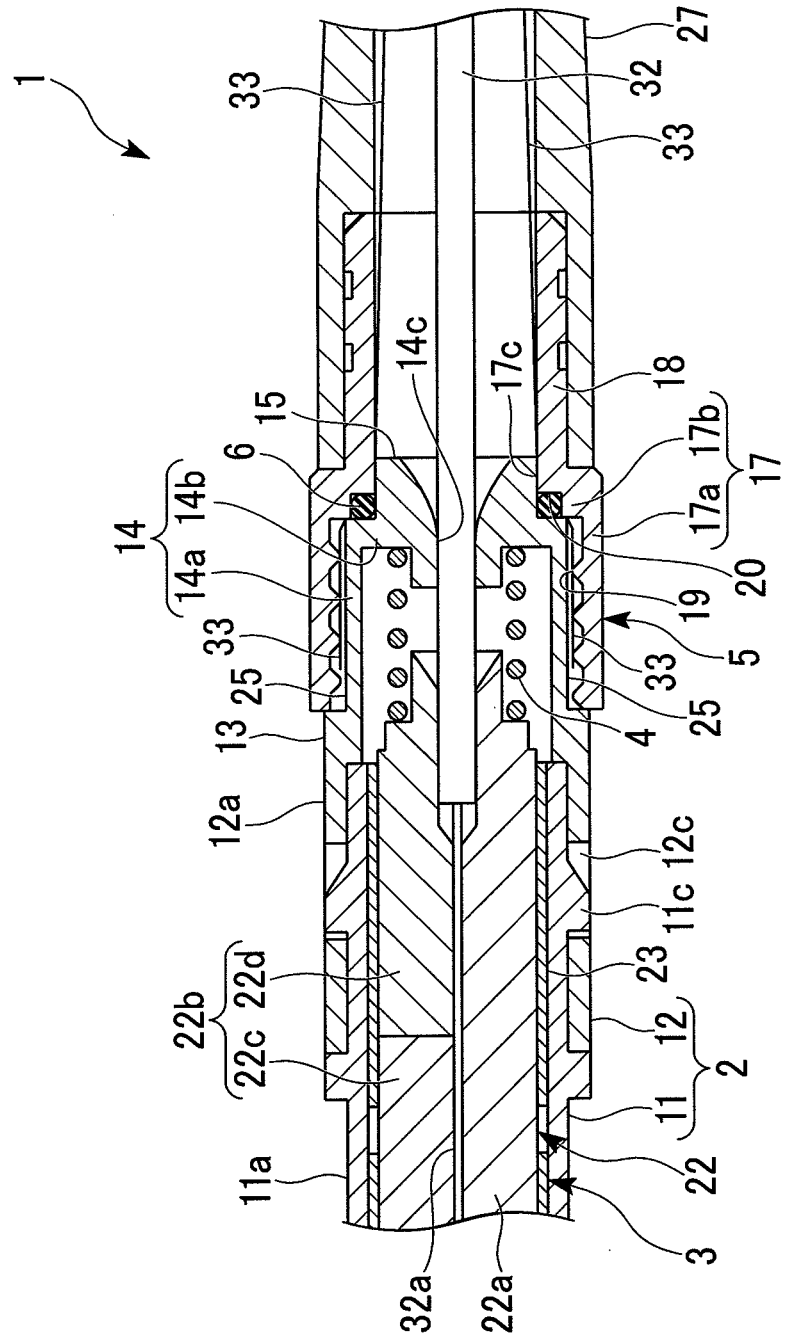
FIG. 3 is an enlarged view of main portions of the optical connector shown in FIG. 1, and is a sectional view taken along a line A-A of FIG. 2.
Figure 4:
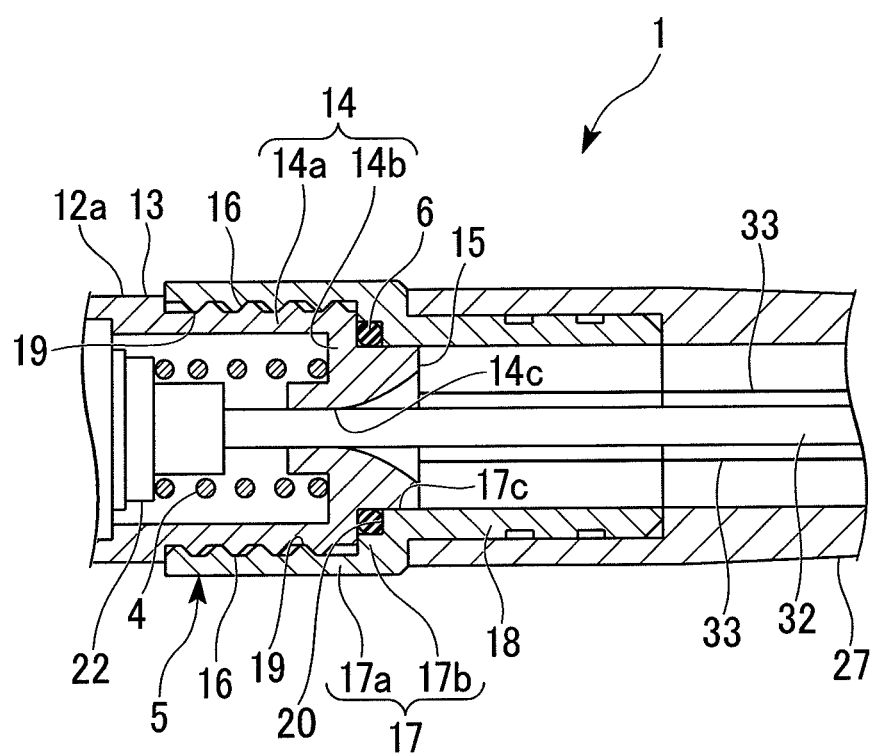
FIG. 4 is an enlarged view of the main portions of the optical connector shown in FIG. 1, and is a sectional view taken along a line B-B of FIG. 2.
Figure 5:
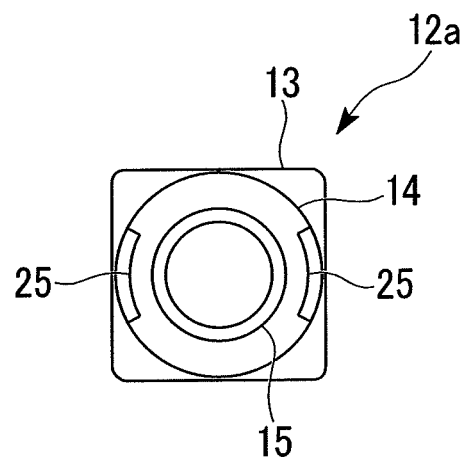
FIG. 5 is a view of a stop ring main body of the optical connector shown in FIG. 1 as seen from the rear side.
Figure 6:
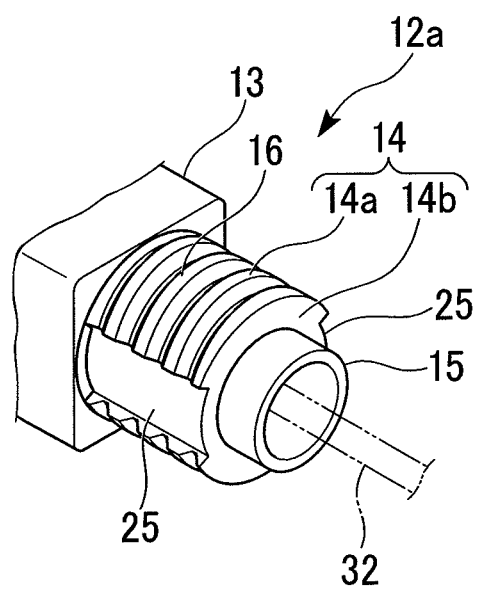
FIG. 6 is a perspective view of a fixing portion of the stop ring main body of the optical connector shown in FIG. 1.
Figure 7:
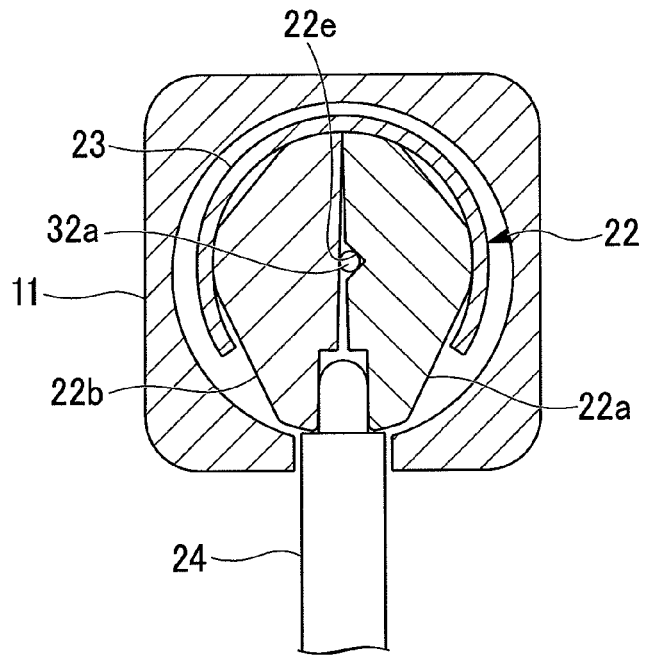
FIG. 7 is a cross-sectional view of a plug frame and a clamping portion of the optical connector shown in FIG. 1.
Figure 8:
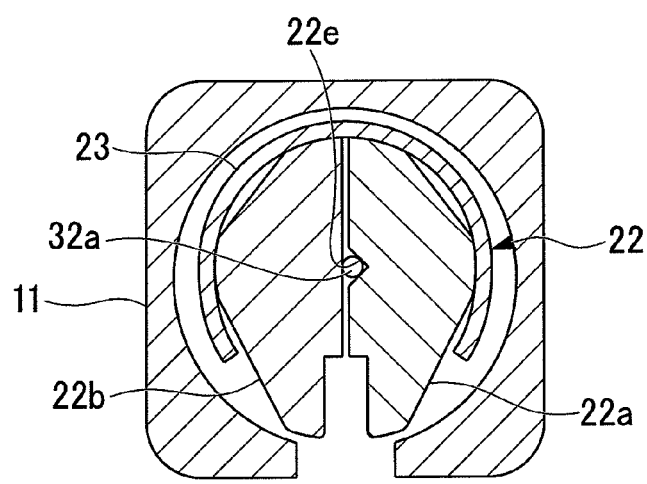
FIG. 8 is a cross-sectional view of the plug frame and the clamping portion of the optical connector shown in FIG. 1.
Figure 8:
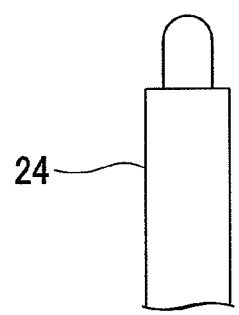

FIG. 1 is a sectional view of an optical connector 1 according to a first embodiment of the present invention. FIG. 1 is a sectional view taken along a line A-A of FIG. 2. FIG. 2 is a perspective view showing the appearance of the optical connector 1. FIG. 3 is an enlarged view of the main portions of the optical connector 1, and is a sectional view taken along the line A-A of FIG. 2. FIG. 4 is an enlarged view of the main portions of the optical connector 1, and is a sectional view taken along a line B-B of FIG. 2. FIG. 5 is a view of a stop ring main body 12a of the optical connector 1 as seen from the rear side. FIG. 6 is a perspective view of a fixing portion 14 of the stop ring main body 12a. FIGS. 7 and 8 are cross-sectional views of a plug frame 11 and a clamping portion 22.

As shown in FIGS. 1 and 2, the optical connector 1 is assembled to a terminal of an optical fiber cable 31.

An optical fiber cable (for example, an optical fiber cord) having a structure where an optical fiber 32 such as an optical fiber core and tension bodies 33 extending in the longitudinal direction of the optical fiber 32 are received in a jacket 34 made of a resin such as polyethylene may be exemplified as the optical fiber cable 31.

An aramid fiber may be preferably used as the tension body 33. However, a glass fiber, a carbon fiber, and the like may be used as the tension body.

In the following description, the left side in FIG. 1, that is, the direction in which the tip of the optical fiber cable 31 faces is referred to as the "front side", and the right side is referred to as the "rear side".

The optical connector 1 includes a housing 2, a ferrule 3 with a clamping portion that is provided in the housing 2, a spring 4 (pushing means) that pushes the ferrule 3 with a clamping portion to the front side, a fixing cap 5 that is mounted on the housing 2, and a retaining ring 6.

The housing 2 includes a sleeve-like plug frame 11 and a cap-like stop ring 12 that is fitted and fixed to the rear end of the plug frame 11.

Meanwhile, a body section (the housing 2, the ferrule 3 with a clamping portion, and the spring 4) on which the fixing cap 5 is mounted is referred to as a "connector body" in this embodiment.

As shown in FIG. 2, the plug frame 11 includes a sleeve-like frame body 11a and an elastic piece 11b that is inclined upward from the side surface of the front end portion of the frame body 11a toward the rear end of the frame body 11a.

The stop ring 12 includes a sleeve-like stop ring main body 12a and an elastic piece 12b that is inclined upward from a side portion of the stop ring main body 12a toward the plug frame 11 fitted to the stop ring main body 12a.

The frame body 11a and the stop ring main body 12a form a housing body 2a, and the elastic pieces 11b and 12b form a latch 2b.

The elastic pieces 11b and 12b are formed so that the protruding tips thereof overlap each other. Accordingly, when the elastic piece 12b is elastically deformed toward the housing body 2a, the elastic piece 11b of the plug frame 11 is pressed, so that the elastic piece 11b is elastically deformed toward the housing body 2a.

When a locking claw 11c formed at the frame body 11a is fitted into a locking window 12c of the stop ring main body 12a, the plug frame 11 and the stop ring 12 are assembled so as to be integrated into each other.

As shown in FIGS. 3 and 4, the stop ring main body 12a includes a prismatic base 13, a fixing portion 14 that extends rearward from the rear end portion of the base 13, and an extended cylindrical portion 15 that extends rearward from the rear end portion of the fixing portion 14.

The fixing portion 14 includes a cylindrical portion 14a, and an end wall portion 14b that extends inward from the rear end of the cylindrical portion 14a.

A screw portion 16 is formed on the outer peripheral surface of the cylindrical portion 14a (see FIG. 4).

The outer surface (rear surface) of the end wall portion 14b is formed substantially perpendicular to the insertion direction of the optical fiber (the forward-rearward direction). An insertion hole 14c into which the optical fiber 32 is inserted is formed at the end wall portion 14b.

The extended cylindrical portion 15 is formed in a cylindrical shape so that the extended cylindrical portion 15 is thinner than the fixing portion 14, that is, the outer diameter of the extended cylindrical portion 15 is smaller than that of the fixing portion 14. The optical fiber 32 can be inserted into the extended cylindrical portion.

As shown in FIGS. 3, 5, and 6, groove portions 25 without screw threads are formed on the outer peripheral surface of the fixing portion 14 in the insertion direction of the optical fiber (the forward-rearward direction).

The width of each of the groove portions 25 is formed so that the tension bodies 33 can be received in the groove portions. The groove portions 25 are formed over the entire length of the fixing portion 14. In the embodiment shown in the drawings, the groove portion 25 is formed to have a substantially fan-like cross-section, and has a constant depth in the longitudinal direction and in the circumferential direction.

In the embodiment shown in the drawings, two groove portions 25 are formed at positions that are rotationally symmetrical to each other with respect to the insertion direction of the optical fiber.

Since the groove portions 25 are formed at the positions rotationally symmetrical to each other, imbalance in the fixing strength between the tension bodies 33 and the housing 2 is hardly generated in the circumferential direction.

Meanwhile, the number of groove portions is not limited to the embodiment shown in the drawings, and may be one or three or more.

As shown in FIGS. 3 and 4, the fixing cap 5 includes a mounting portion 17 that is mounted on the fixing portion 14 and a cylindrical connecting portion 18 that extends rearward from the rear end portion of the mounting portion 17.

The mounting portion 17 includes a cylindrical portion 17a and an end wall portion 17b that extends inward from the rear end of the cylindrical portion 17a. An insertion hole 17c into which the optical fiber 32 is inserted is formed at the end wall portion 17b.

A screw portion 19, which is threadedly engaged with the screw portion 16 of the fixing portion 14, is formed on the inner surface of the cylindrical portion 17a.

An annular ring recess 20 in which the retaining ring 6 is disposed is formed on the inner surface (front surface) of the inner peripheral edge portion of the end wall portion 17b.

As shown in FIGS. 3 and 4, the fixing cap 5 clamps the tension bodies 33, which lead from the terminal of the optical fiber cable 31, between the stop ring main body 12a and itself and can screw and fix the tension bodies to the fixing portion 14.

That is, it may be possible to fix the fixing cap 5 to the fixing portion 14 by screwing and fitting the screw portion 19, which is formed on the inner surface of the cylindrical portion 17a, onto the screw portion 16 of the fixing portion 14.

The retaining ring 6 is to retain the tension bodies 33, which lead from the terminal of the optical fiber cable 31, on the housing 2. The retaining ring 6 is provided so as to surround the extended cylindrical portion 15, and is to retain the tension bodies 33 by clamping the tension bodies 33 between the extended cylindrical portion 15 and itself.

It is preferable that the retaining ring 6 be formed of an elastic body made of a resin or the like and retain the tension bodies 33 by clamping the tension bodies 33 between the extended cylindrical portion 15 and itself with the elastic force of the elastic body.

In the embodiment shown in the drawings, the retaining ring 6 is formed so as to have a circular cross-section, is disposed in the ring recess 20 of the fixing cap 5, and faces the outer surface of the end wall portion 14b of the fixing portion 14 and the outer surface of the extended cylindrical portion 15.

The retaining ring 6 may be adapted so as to clamp the tension bodies 33 between the end wall portion 14b and the extended cylindrical portion 15.

As shown in FIGS. 1, 7, and 8, the ferrule 3 with a clamping portion includes a ferrule 21 and a clamping portion 22 that is assembled on the rear end side of the ferrule 21 (on the side opposite to a connecting end surface 21a).

A built-in optical fiber 10 such as a bare optical fiber is inserted and fixed to the ferrule 21. The built-in optical fiber 10 is referred to as a ferrule-side optical fiber 10.

The ferrule-side optical fiber 10 protrudes from the rear end of the ferrule 21. A protrusion 10a, which is a protruding portion, is inserted between a pair of elements 22a and 22b of the clamping portion 22.

The clamping portion 22 has a structure where an extending portion 22a (hereinafter, referred to as an element 22a) extending from a flange portion 21b of the ferrule 21 and the element 22b facing the extending portion are received in a sleeve-like spring 23 having a C-shaped cross-section.

The element 22b is formed of two lid-side elements 22c and 22d that are lined up in the forward-rearward direction.

An alignment groove 22e, which positions the optical fiber 10 and the optical fiber 32, is formed at one or both of the elements 22a and 22b.

As shown in FIGS. 7 and 8, a wedge member 24 is inserted between the elements 22a and 22b so as to widen a gap between the pair of elements 22a and 22b of the clamping portion 22 against the elasticity of the spring 23. Accordingly, it may be possible to insert a tip portion 32a of the optical fiber 32 into the clamping portion 22.

The optical fiber 32 is pushed toward the ferrule 21, so that the optical fiber can be in contact with and connected to the ferrule-side optical fiber 10. Reference numeral 26 in FIG. 1 denotes a connection point between the protrusion 10a of the optical fiber 10 and the tip portion 32a of the optical fiber 32. A refractive index matching agent may be interposed between the end surfaces of the optical fiber 10 and the optical fiber 32.

Meanwhile, the clamping portion 22 having the structure where the elements 22a and 22b formed integrally with the flange portion 21b of the ferrule 21 are received in the spring 23 has been employed in the embodiment shown in the drawings. However, the connection structure of the optical fiber is not limited thereto. As long as the optical fiber can be mechanically positioned, abutted, and reliably connected, any other structure may be employed.

In the connection between the optical fiber 10 and the optical fiber 32, PC contact (physical contact) may be employed without using a refractive index matching agent. In this case, it is preferable that the connecting end surface of the optical fiber 10 have the shape of a curved and convex surface. Further, it is preferable that the optical fiber 32 be pushed toward the optical fiber 10 so as to be in contact with the optical fiber 10 with a predetermined pressure.

As shown in FIG. 3, the spring 4 is provided in the stop ring 12, receives a reaction force from the end wall portion 14b of the fixing portion 14, and pushes the ferrule 3 with a clamping portion to the front side. The spring 4 is, for example, a coil spring.

As shown in FIG. 1, a boot 27 can be mounted on the cylindrical connecting portion 18 of the fixing cap 5. Reference numeral 28 denotes a protective tube that is made of a resin or the like.

Here, a so-called LC-type optical connector is exemplified as the optical connector 1. The optical connector 1 is not limited to the LC-type optical connector, and may be an optical connector such as a SC2-type optical connector. The SC2-type optical connector is an optical connector obtained by removing a knob, which is mounted on the housing of a SC-type optical connector, from the SC-type optical connector (SC: Single fiber coupling optical fiber connector. An F04-type optical connector (optical connector plug) or the like is defined by JIS C 5973).

A method of assembling the optical connector 1 to the terminal of the optical fiber cable 31 will be described next.

As shown in FIGS. 1, 7, and 8, the optical fiber 32 is exposed from the terminal of the optical fiber cable 31, the tension bodies 33 are led, and a sheath of the tip portion of the optical fiber 32 is removed. The tip portion 32a is, for example, a bare optical fiber.

The tip portion 32a of the optical fiber 32 is inserted into the gap between the elements 22a and 22b widened by the wedge member 24, so that the tip portion 32a of the optical fiber 32 is in contact with and connected to the protrusion 10a of the ferrule-side optical fiber 10.

Meanwhile, the optical fiber cable 31 is inserted into the retaining ring 6, the fixing cap 5, the boot 27, and the protective tube 28 in advance.

Figure 9:
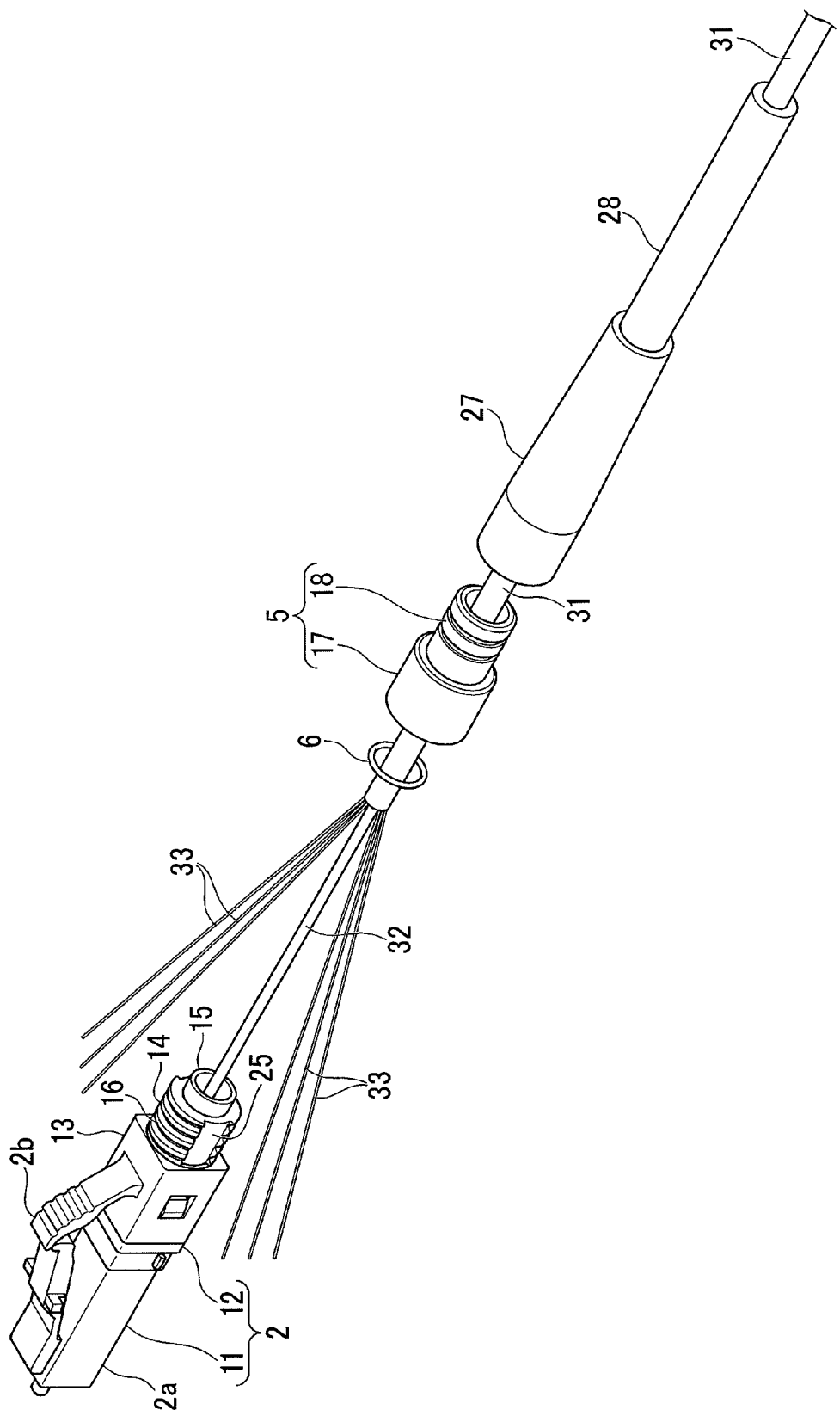
FIG. 9 is a view illustrating a process for assembling the optical connector shown in FIG. 1.
Figure 10:
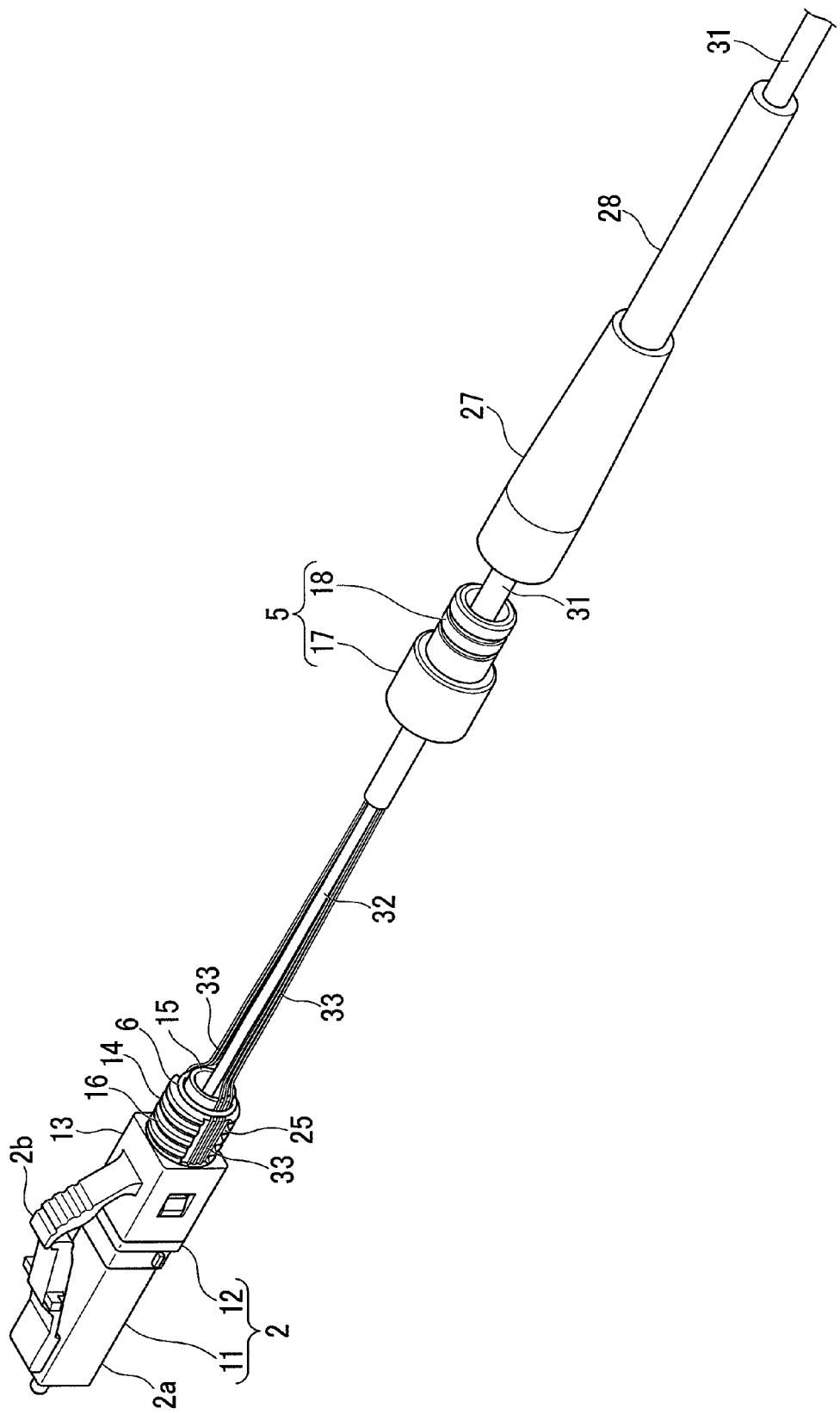
FIG. 10 is a view illustrating a process following the previous drawing.

As shown in FIGS. 9 and 10, the tension bodies 33 are tied in two bundles and the tip portions of the bundles are disposed in the groove portions 25 of the fixing portion 14.

If the retaining ring 6 is mounted on the extended cylindrical portion 15 in this state, the tension bodies 33 are interposed and retained between the retaining ring 6 and the extended cylindrical portion 15.

After that, the mounting portion 17 of the fixing cap 5 is rotated in a fastening direction and is screwed to the fixing portion 14.

The tension bodies 33 are interposed and fixed between the fixing cap 5 and the housing 2.

Positions where the tension bodies 33 are interposed are, for example, positions between the end wall portion 17b of the fixing cap 5 and the end wall portion 14b of the fixing portion 14 or positions between the retaining ring 6 and the end wall portion 14b.

During the screwing, the fixing cap 5 is rotated in the circumferential direction. However, since the tension bodies 33 are positioned in the groove portions 25 and retained by the retaining ring 6, the tension bodies 33 are not moved as the fixing cap 5 is moved. For this reason, it may be possible to reliably fix the tension bodies 33 to the housing 2.

If the tension bodies 33 are insufficiently fixed by an incorrect operation or the like, it may be possible to mount the fixing cap 5 again after separating the fixing cap 5 by rotating the fixing cap 5 in a release direction (in a direction opposite to the fastening direction).

Figure 11:
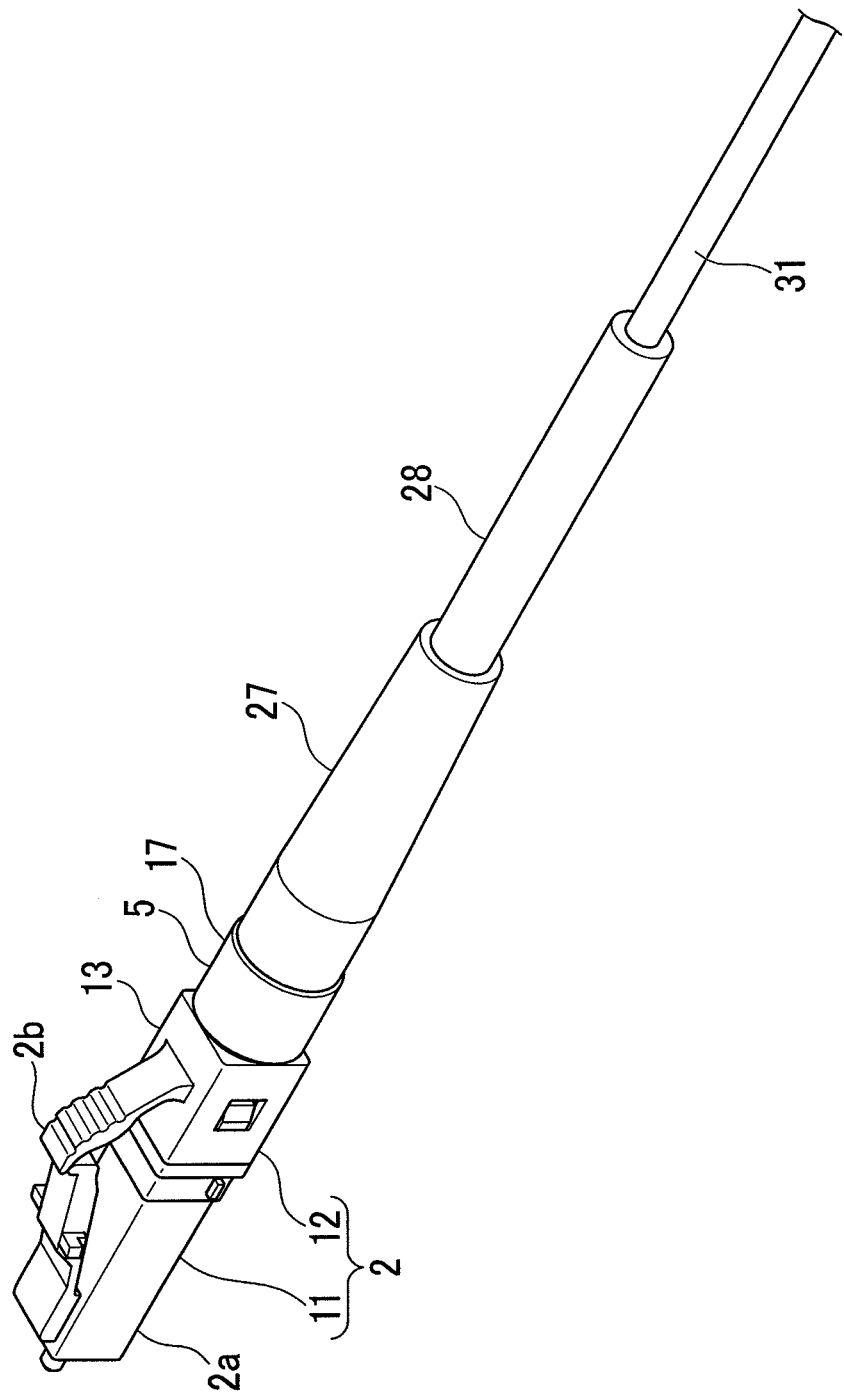
FIG. 11 is a view illustrating a process following the previous drawing.

The boot 27 is mounted on the cylindrical connecting portion 18 of the fixing cap 5 and the protective tube 28 is disposed at a predetermined position as shown in FIG. 11, so that the assembly of the optical connector 1 is completed.

The optical connector 1 has a structure where the fixing cap 5 is screwed to the fixing portion 14 so as to fix the tension bodies 33. A dedicated tool is needed in a general-purpose caulking fixing structure. However, since screwing has been employed in the optical connector 1, a dedicated tool is not needed. Therefore, the optical connector is easily assembled.

Further, since screwing is employed, it may be possible to firmly fix the tension bodies 33 to the housing 2 and provide sufficient strength to a connection portion connected to the optical fiber cable 31.

Furthermore, since the number of parts of a fixing structure is small in the optical connector 1 and the structure of the optical connector is simple, it may be possible to reduce the number of assembling processes. Since the structure of the optical connector is simple, it may be possible to reduce the size of the optical connector 1, that is, to reduce the entire length of the optical connector.

In the general-purpose caulking fixing structure, it is difficult to detach a caulking member that has been fixed once. Accordingly, if the tension bodies are insufficiently fixed due to an incorrect operation or the like, an operation for fixing a caulking member to a new terminal needs to be performed after the removal of a portion of the optical fiber where the caulking member is fixed.

In contrast, screwing is employed in the optical connector 1. Accordingly, if the tension bodies 33 are insufficiently fixed due to an incorrect operation or the like, it may be possible to mount the fixing cap 5 again after removing the fixing cap 5. Therefore, the yield of the assembling of the optical connector 1 becomes high.

Meanwhile, the Kevlar fixing structure of the end portion of the optical connector is not limited to a site assembly-type optical connector and may be applied to other-types of optical connectors.

Figure 12:
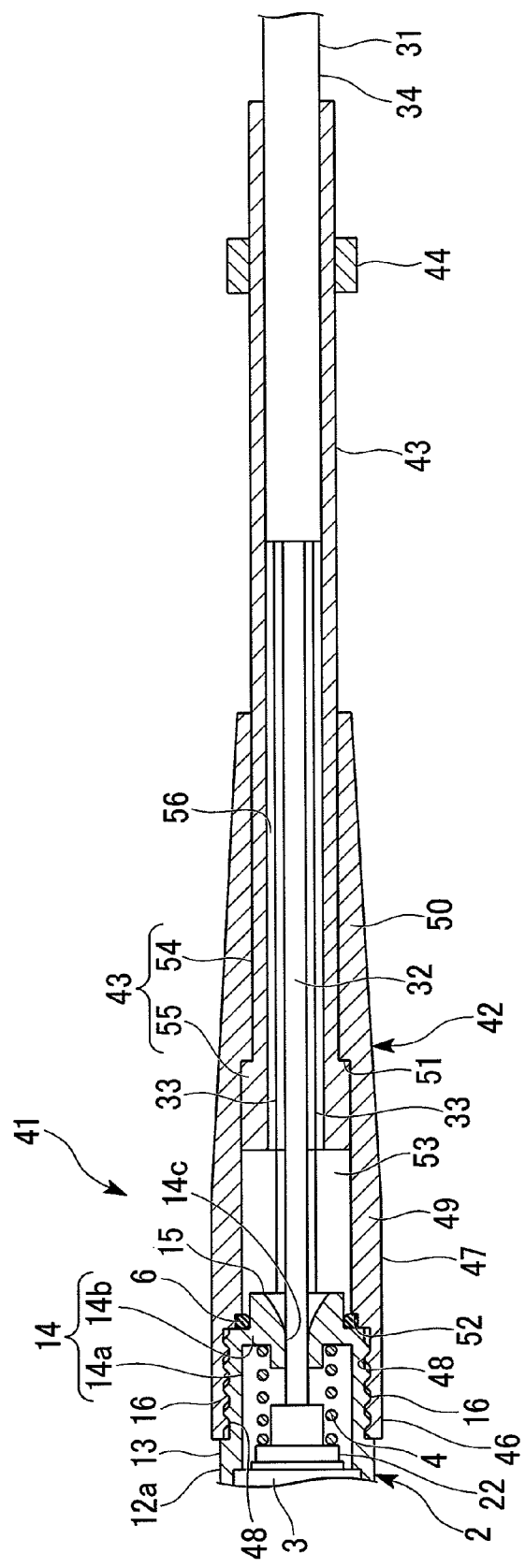
FIG. 12 is a sectional view of an optical connector according to another embodiment of the present invention.
Figure 13:
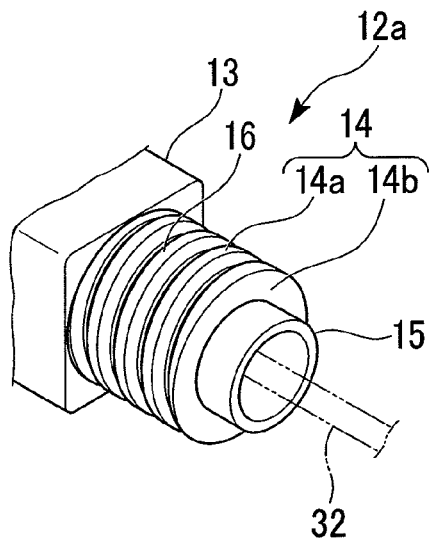
FIG. 13 is a perspective view of a fixing portion of the optical connector shown in FIG. 12.
Figure 14:
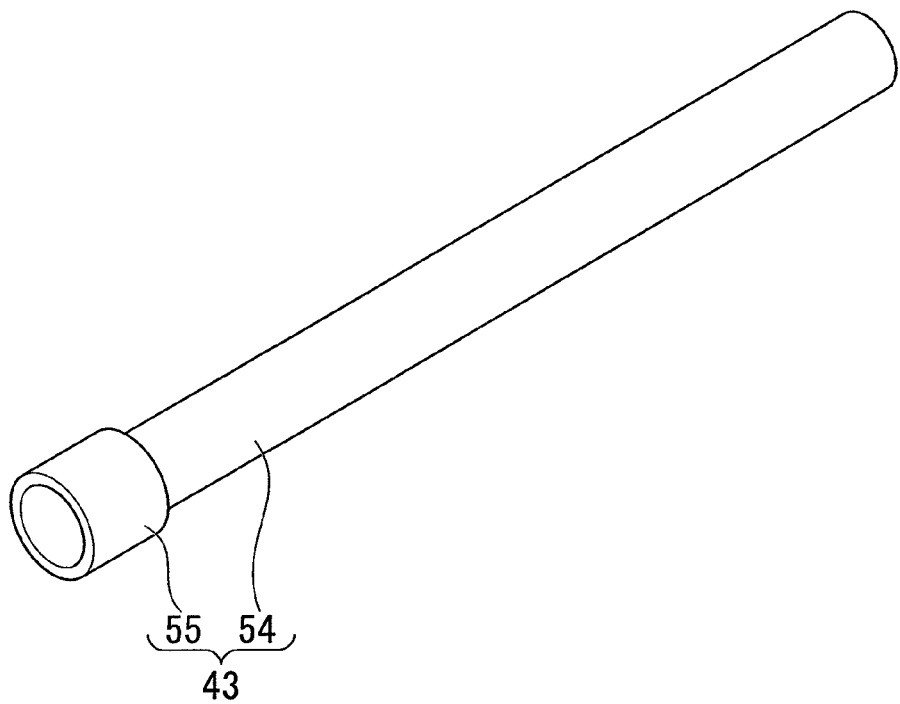
FIG. 14 is a perspective view of a protective tube of the optical connector shown in FIG. 12.

FIG. 12 is a sectional view of an optical connector 41 according to a second embodiment of the present invention. FIG. 13 is a perspective view of a fixing portion 14 of the optical connector 41. FIG. 14 is a perspective view of a protective tube 43 of the optical connector 41.

In the following description, the components described above will be denoted by the same reference numerals and the description thereof will be omitted.

As shown in FIG. 12, an optical connector 41 includes a housing 2, a ferrule 3 with a clamping portion that is provided in the housing 2, a spring 4 that pushes the ferrule 3 with a clamping portion to the front side, a fixing cap 42 that is mounted on the housing 2, a retaining ring 6, a protective tube 43, and a retaining tool 44 that retains the protective tube 43 on the optical fiber cable 31.

As shown in FIG. 13, groove portions are not formed on the fixing portion 14 of the optical connector 41 and a screw portion 16 is formed over the entire circumference of the fixing portion 14 unlike in the optical connector 1 shown in FIG. 6.

As shown in FIG. 12, the fixing cap 42 is made of a resin or the like and includes a mounting portion 46 that is fixed to the fixing portion 14 and a cylindrical connecting portion 47 that is connected to the rear end of the mounting portion 46.

The mounting portion 46 is formed in a cylindrical shape, and a screw portion 48, which is threadedly engaged with the screw portion 16 of the fixing portion 14, is formed on the inner surface of the mounting portion.

The cylindrical connecting portion 47 is formed in the shape of a cylinder that includes a large-diameter portion 49 having a substantially constant inner diameter and a small-diameter portion 50 formed so as to extend rearward from the rear end of the large-diameter portion 49.

The inner diameter of the small-diameter portion 50 is smaller than that of the large-diameter portion 49, and a locking stepped portion 51, which forms the surface perpendicular to the axial direction, is formed at a boundary between the large-diameter portion 49 and the small-diameter portion 50.

An annular ring recess 52 in which the retaining ring 6 is disposed is formed on the inner surface of the front end portion of the cylindrical connecting portion 47.

The inner portion of the cylindrical connecting portion 47 forms an optical fiber insertion portion 53 into which the optical fiber 32 is inserted.

The rear portion of the cylindrical connecting portion 47 is formed so that the outer diameter and the thickness of the rear portion of the cylindrical connecting portion are decreased toward the rear end. Accordingly, it is easier to bend the cylindrical connecting portion at a position closer to the rear end. Meanwhile, slits (not shown) may be formed at the tapered portion 50 in the circumferential direction in order to improve flexibility.

It is preferable that the fixing cap 42 be made of a flexible material such as rubber.

As shown in FIGS. 12 and 14, the protective tube 43 is integrally made of a resin such as polyester elastomer. The protective tube 43 includes a tube main body 54 that is formed in a cylindrical shape and a flange portion 55 (locking protrusion) that is formed at the front end of the tube main body 54.

The outer diameter of the tube main body 54 may be substantially equal to or slightly smaller than the inner diameter of the small-diameter portion 50. The tube main body 54 is inserted into the small-diameter portion 50 and extends rearward from the rear end of the fixing cap 42.

The flange portion 55 is to prevent the protective tube 43 from being separated from the fixing cap 42 toward the rear side, and is an annular protrusion that protrudes outward from the outer surface of the tube main body 54. The outer diameter of the flange portion 55 is larger than the inner diameter of the small-diameter portion 50 at the very least. The outer diameter of the flange portion 55 may be substantially equal to or slightly smaller than the inner diameter of the large-diameter portion 49 at the very least.

The tube main body 54 is inserted into the small-diameter portion 50 of the fixing cap 42 and the flange portion 55 is positioned in the large-diameter portion 49. Accordingly, when a force is applied to the protective tube 43 toward the rear side, the rear end surface of the flange portion 55 comes into contact with the locking stepped portion 51, so that the rearward movement of the flange portion beyond the locking stepped portion is restricted.

The inner portion of the protective tube 43 forms an optical fiber insertion portion 56 into which the optical fiber 32 is inserted.

The protective tube 43 is not fixed to the fixing cap 42. For this reason, when the fixing cap 42 is screwed to the fixing portion 14, torque is not applied to the protective tube 43.

Meanwhile, a position where the flange portion 55 is formed is not limited to the end portion of the tube main body 54, and may be an intermediate position between both end portions of the tube main body 54. Further, as long as the locking protrusion of the present invention is locked to the locking stepped portion of the fixing cap and prevents the rearward movement of the flange portion, the locking protrusion may have any other structure. The flange portion is not limited to the shape shown in the drawings, and may be, for example, a protrusion that is discontinuous in the circumferential direction.

Figure 16:
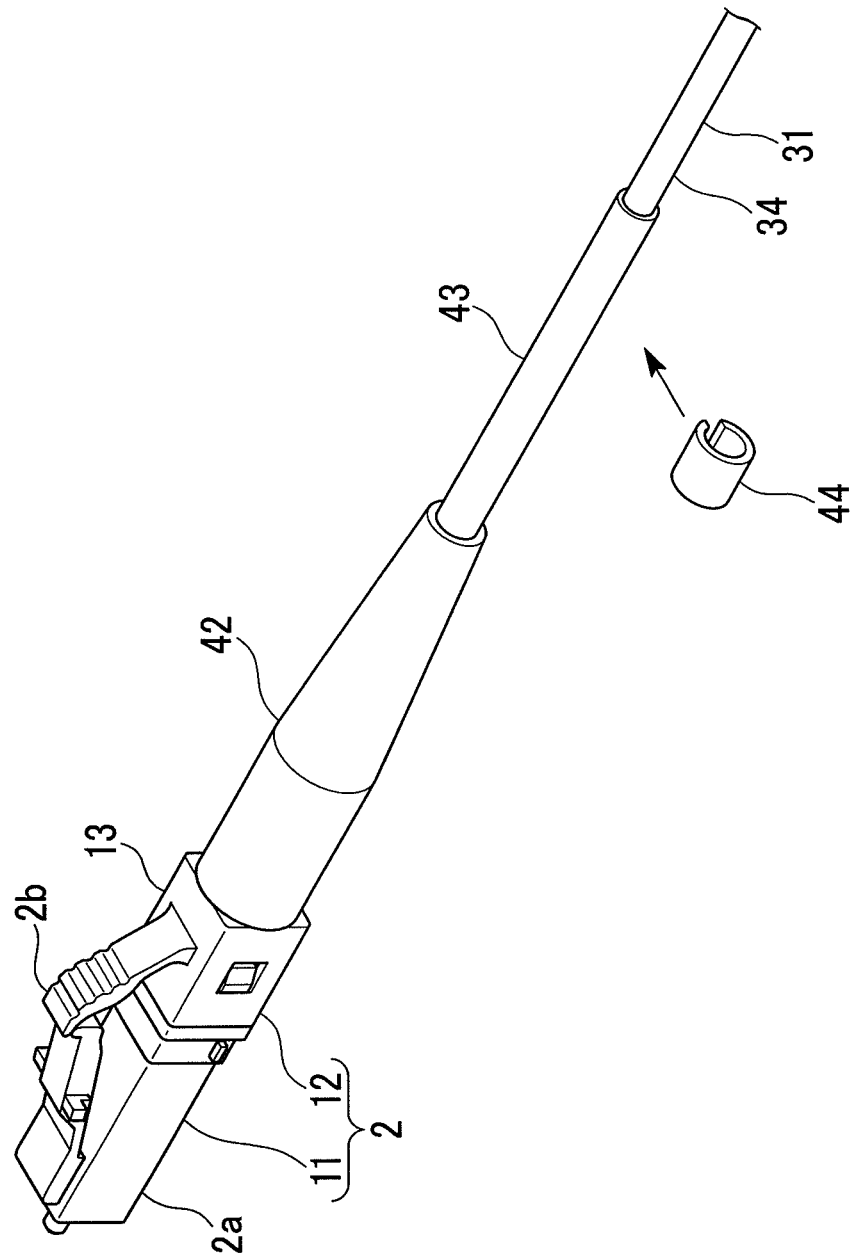
FIG. 16 is a view illustrating a process following the previous drawing.
Figure 17:
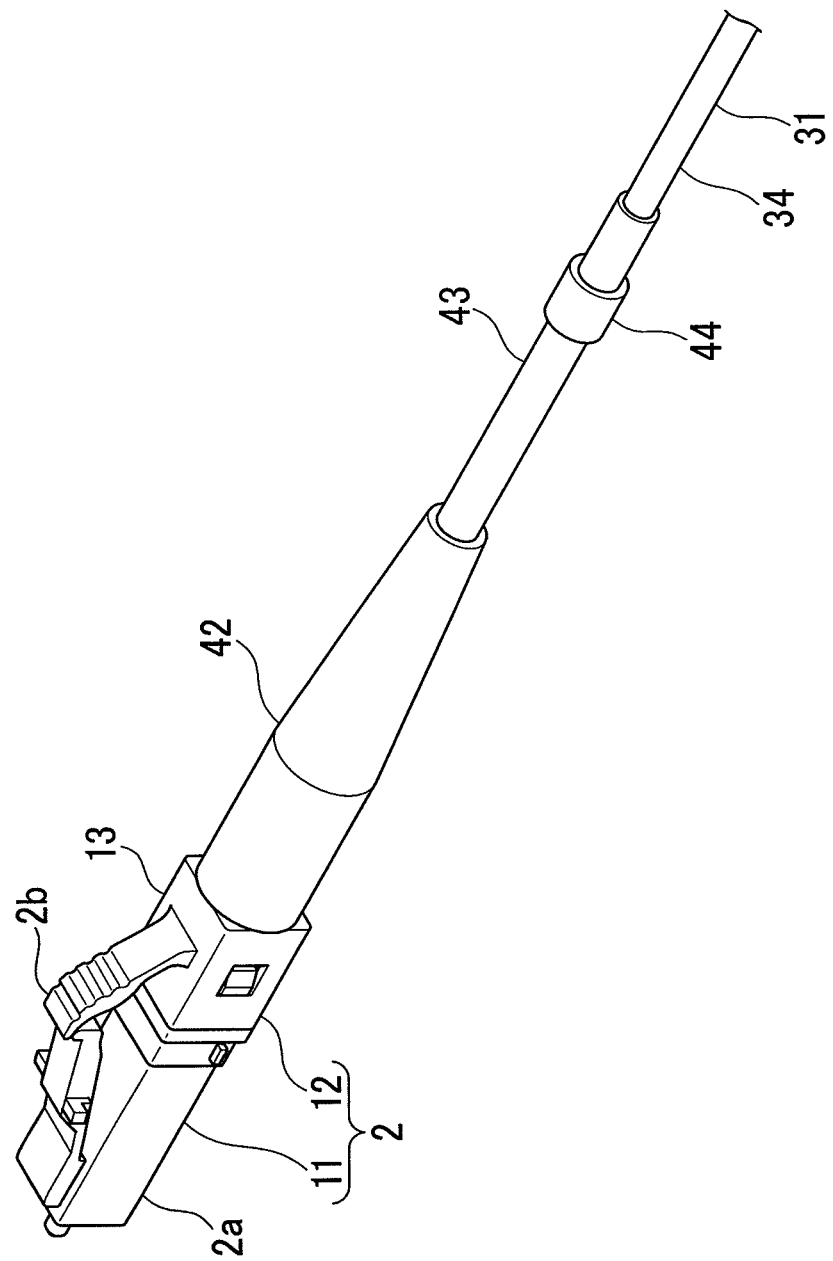
FIG. 17 is a view illustrating a process following the previous drawing.
Figure 18:
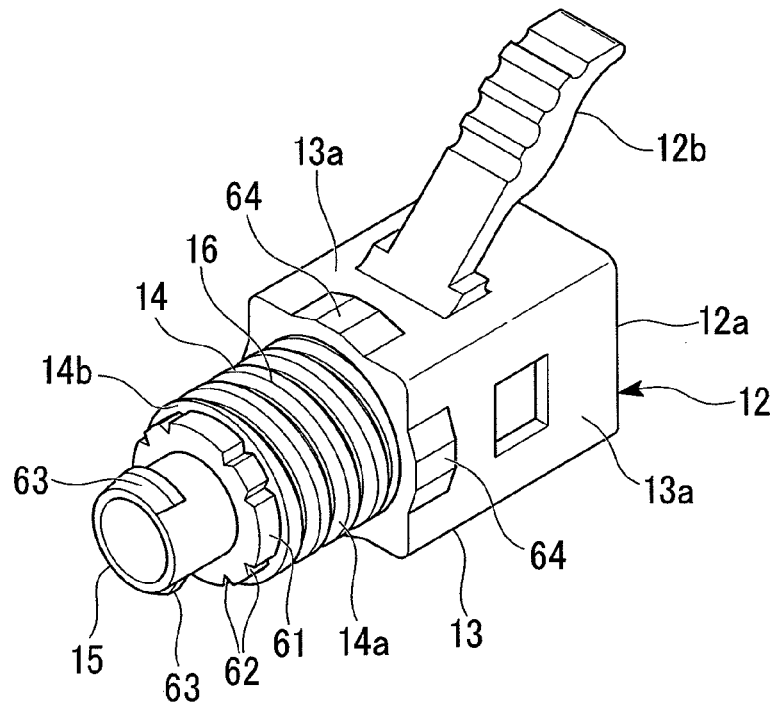
FIG. 18 is a perspective view of a stop ring that is used in an optical connector according to another embodiment of the present invention.
Figure 19:
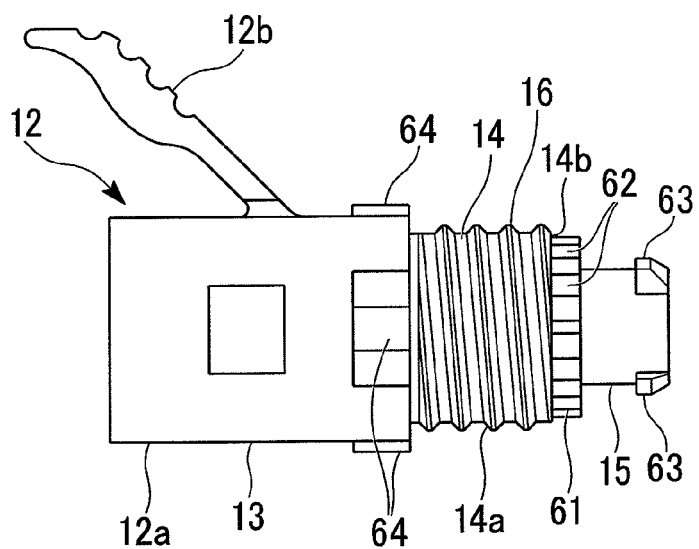
FIG. 19 is a side view of the stop ring shown in FIG. 18.
Figure 20:
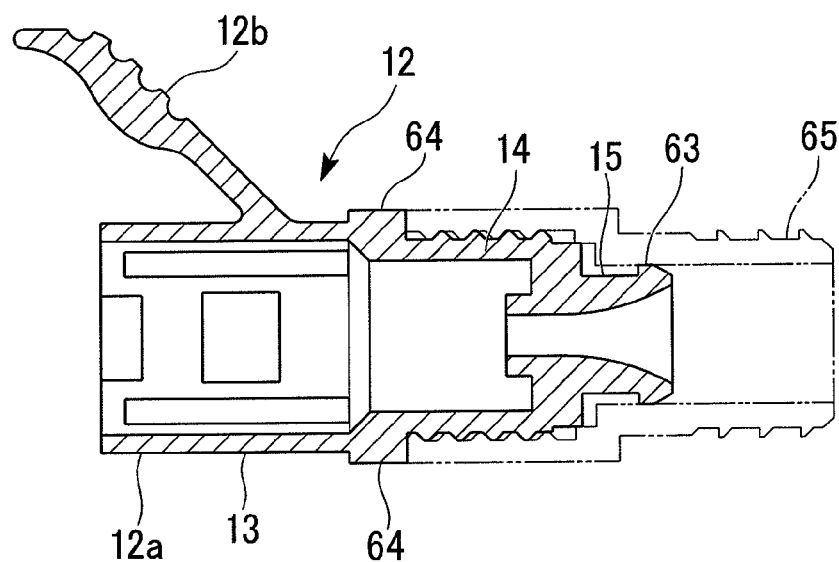
FIG. 20 is a sectional view of the stop ring shown in FIG. 18 and a fixing cap that is mounted on the stop ring.
Figure 21:
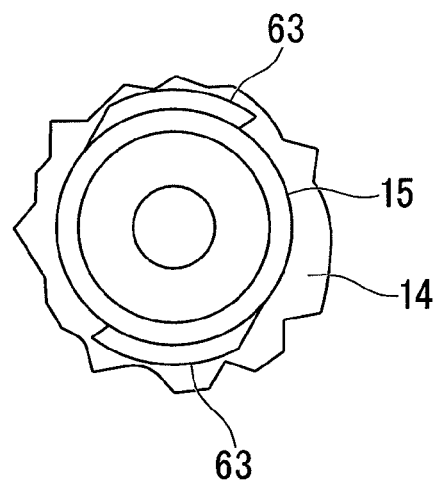
FIG. 21 is a rear view of an extended cylindrical portion of the stop ring shown in FIG. 18.
Figure 22:
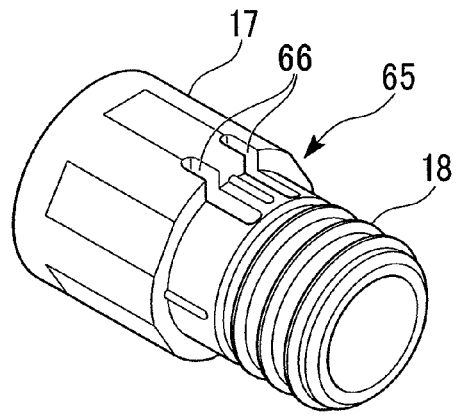
FIG. 22 is a perspective view of the fixing cap that is used in the optical connector according to another embodiment of the present invention.

As shown in FIG. 12, the retaining tool 44 is formed so as to have a C-shaped cross-section, and fixes the protective tube 43 to the jacket 34 of the optical fiber cable 31 by pressing the protective tube 43 by the elastic force (clamping force) of the retaining tool 44 (see FIGS. 16 and 17).

A method of assembling the optical connector 41 to the terminal of the optical fiber cable 31 will be described next.

Figure 15:
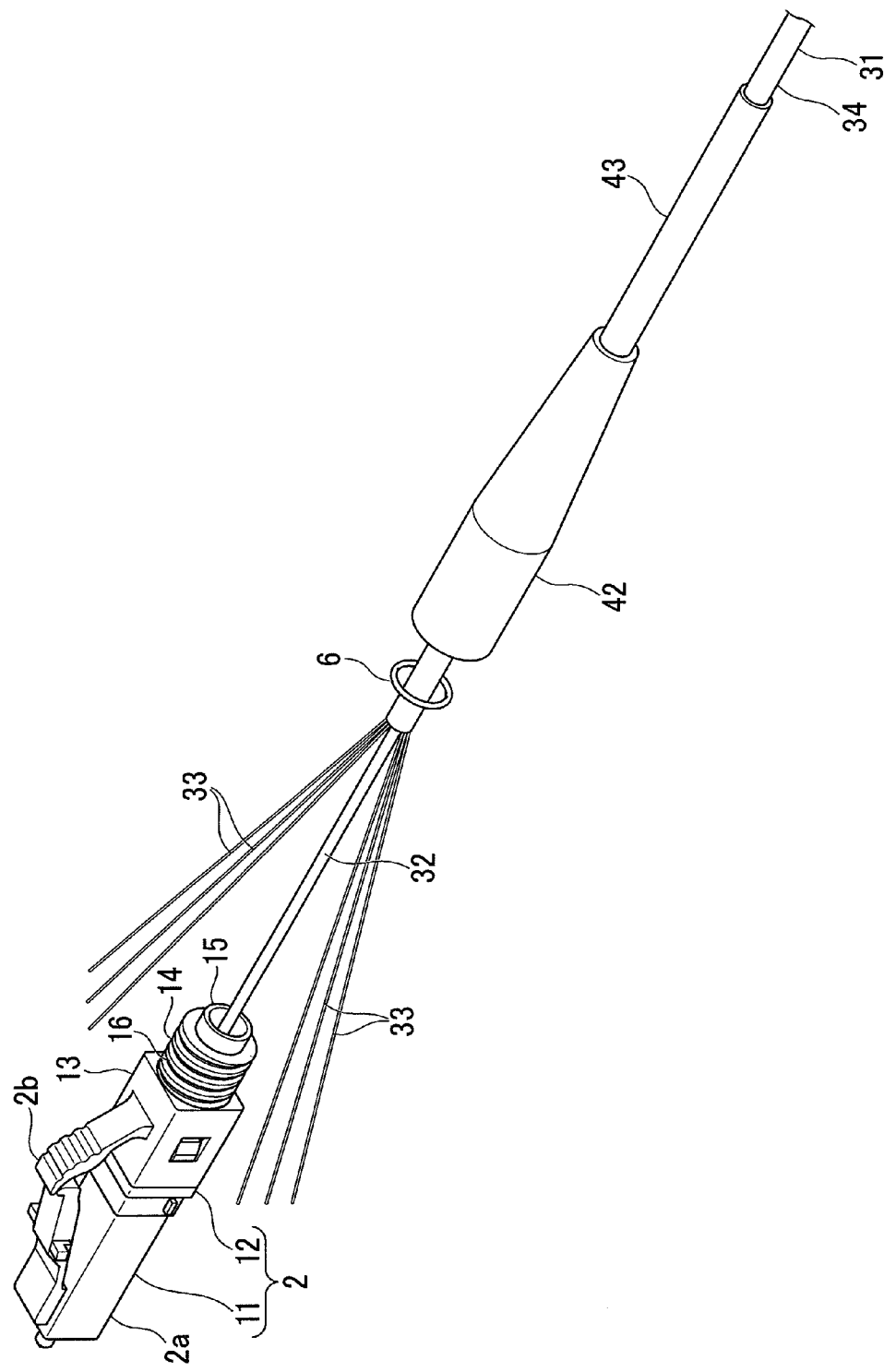
FIG. 15 is a view illustrating a process for assembling the optical connector shown in FIG. 12.

As shown in FIGS. 15 and 16, the tension bodies 33 are retained on the extended cylindrical portion 15 by the retaining ring 6. Then, the fixing cap 42 is screwed to the fixing portion 14. Accordingly, the tension bodies 33 are interposed and fixed between the fixing cap 42 and the fixing portion 14.

After that, the retaining tool 44 is mounted on the outer peripheral surface of the protective tube 43 as shown in FIG. 17, so that the protective tube 43 is fixed to the jacket 34 of the optical fiber cable 31.

The optical connector 41 has the structure where the tension body 33 is fixed by the screwing of the fixing cap 42 to the fixing portion 14. Accordingly, it is easy to assemble the optical connector 41 and it may be possible to firmly fix the tension bodies 33 to the housing 2 and to provide sufficient strength to the connection portion.

Further, since the screw portion 16 is formed over the entire circumference of the fixing portion 14, it may be possible to reliably interpose the tension bodies 33 between the fixing cap 42 and the fixing portion 14 that are screwed and fitted to each other. Accordingly, it may be possible to increase the fixing strength of the tension bodies 33.

In general, a jacket of an optical fiber cable contracts in the longitudinal direction due to the variation in temperature or the like.

In contrast, the protective tube 43 including the flange portion 55 is fixed to the jacket 34 in the optical connector 41. Accordingly, when a force is applied to the protective tube 43 toward the rear side due to the contraction of the jacket 34, the flange portion 55 comes into contact with the locking stepped portion 51 of the fixing cap 42, so that the rearward movement of the flange portion beyond the fixing cap is restricted.

Therefore, even when the jacket 34 contracts due to variations in temperature or the like, it may be possible to prevent the jacket 34 from being separated from the optical connector 41 toward the rear side.

FIGS. 18 to 28 are views showing an optical connector according to another embodiment of the present invention.

As shown in FIGS. 18 to 21, an annular protrusion 61 along the circumferential direction of the end wall portion 14b is formed on the rear surface of an end wall portion 14b of a stop ring main body 12a, and a plurality of movement preventing recesses 62, which prevents the movement of the tension bodies 33 in the circumferential direction, is formed on the outer peripheral surface of the annular protrusion 61.

A rising convex portion 63 is formed in the circumferential direction at a part of the outer peripheral surface of a tip portion of an extended cylindrical portion 15. A plurality of rising convex portions 63 may be formed at intervals in the circumferential direction.

Swollen convex portions 64 are formed at the rear end portions of the side surfaces 13a of a base 13. The swollen convex portions 64 increase the area of the portions of the base 13 facing a fixing cap 65 and increase the fixing strength of the tension bodies 33 that are interposed between the base and the fixing cap.

As shown in FIGS. 22 to 25, the fixing cap 65 includes a mounting portion 17 that is mounted on the fixing portion 14 and a cylindrical connecting portion 18 that extends rearward from the rear end portion of the mounting portion 17.

A pair of slits 66 is formed at the fixing cap 65 in the axial direction (the forward-rearward direction). The pair of slits 66 is formed at positions, which are close to each other in the circumferential direction with a gap interposed therebetween, from the rear portion of the mounting portion 17 over the front portion of the cylindrical connecting portion 18.

A screw portion 19, which is threadedly engaged with the screw portion 16 of the fixing portion 14, is formed on the inner peripheral surface of the mounting portion 17.

Figure 23:
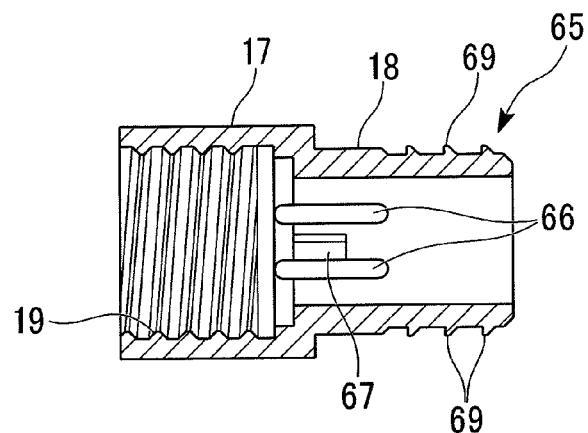
FIG. 23 is a sectional view of the fixing cap shown in FIG. 22.
Figure 25:
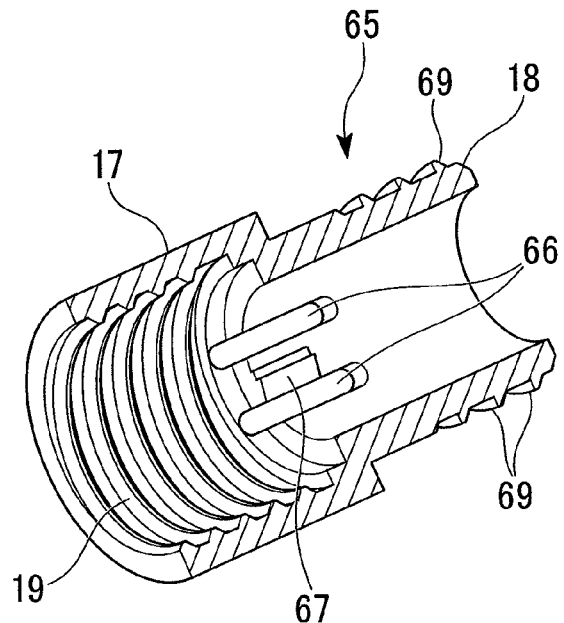
FIG. 25 is a perspective sectional view of the fixing cap shown in FIG. 22.

As shown in FIGS. 23 and 25, an operational convex portion 67 for providing an operational feeling (click feeling) to a user is formed on the inner surface of the cylindrical connecting portion 18. The operational convex portion 67 is formed at a position that reaches the rising convex portion 63 while the fixing cap 65 is screwed onto the fixing portion 14.

The operational convex portion 67 is formed at the position between the slits 66 and 66. Since a portion between the slits 66 and 66 can be elastically bent outward when the operational convex portion 67 runs on the rising convex portion 63, the screwing of the fixing cap 65 is not hindered.

Meanwhile, the slits 66 and the operational convex portion 67 may not be formed at the fixing cap 65.

Figure 24:
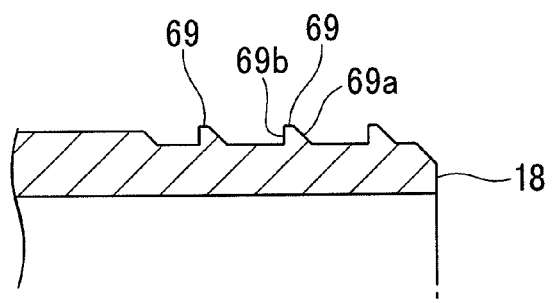
FIG. 24 is a sectional view of main portions of the fixing cap shown in FIG. 22.

As shown in FIGS. 23 and 24, separation preventing protrusions 69 are formed on the outer peripheral surface of the cylindrical connecting portion 18. The separation preventing protrusion 69 is to prevent the separation of a boot 70 and is an annular protrusion that is formed in the circumferential direction of the cylindrical connecting portion 18.

The rear surface 69a of the separation preventing protrusion 69 is inclined so that the diameter of the separation preventing protrusion is decreased toward the rear side.

It is preferable that the inclination angle of the rear surface 69a (the inclination angle with respect to the axial direction of the cylindrical connecting portion 18) be smaller than that of the front surface 69b. In the embodiment shown in the drawings, the separation preventing protrusion 69 is formed so as to have a substantially trapezoidal cross-section and the front surface 69b is substantially perpendicular to the axial direction.

Figure 26:
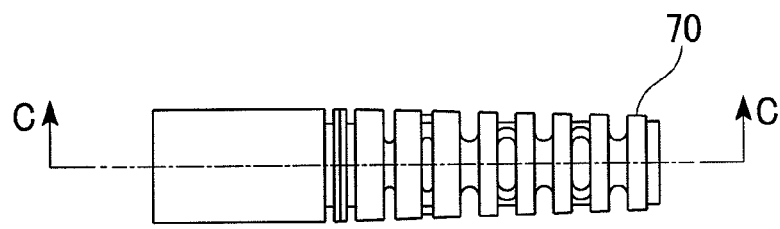
FIG. 26 is a side view of a boot that is used in the optical connector according to another embodiment of the present invention.
Figure 27:
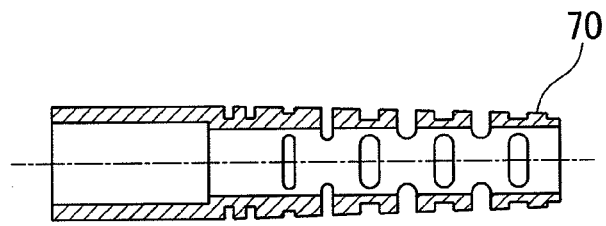
FIG. 27 is a sectional view of the boot shown in FIG. 26 and is a sectional view taken along a line C-C of FIG. 26.
Figure 28:
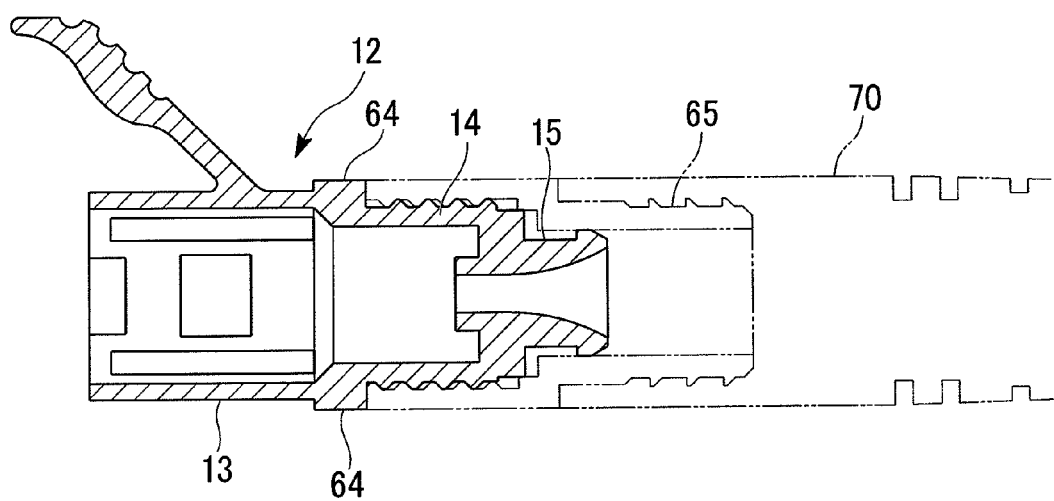
FIG. 28 is a side view of the stop ring, the fixing cap, and the boot of the optical connector according to another embodiment of the present invention.

As shown in FIGS. 26 to 28, the boot 70 made of a relatively soft resin or the like is locked to the separation preventing protrusions 69. Accordingly, even though a pulling force is applied to the boot toward the rear side, the boot is not separated from the cylindrical connecting portion 18.

Figure 29:
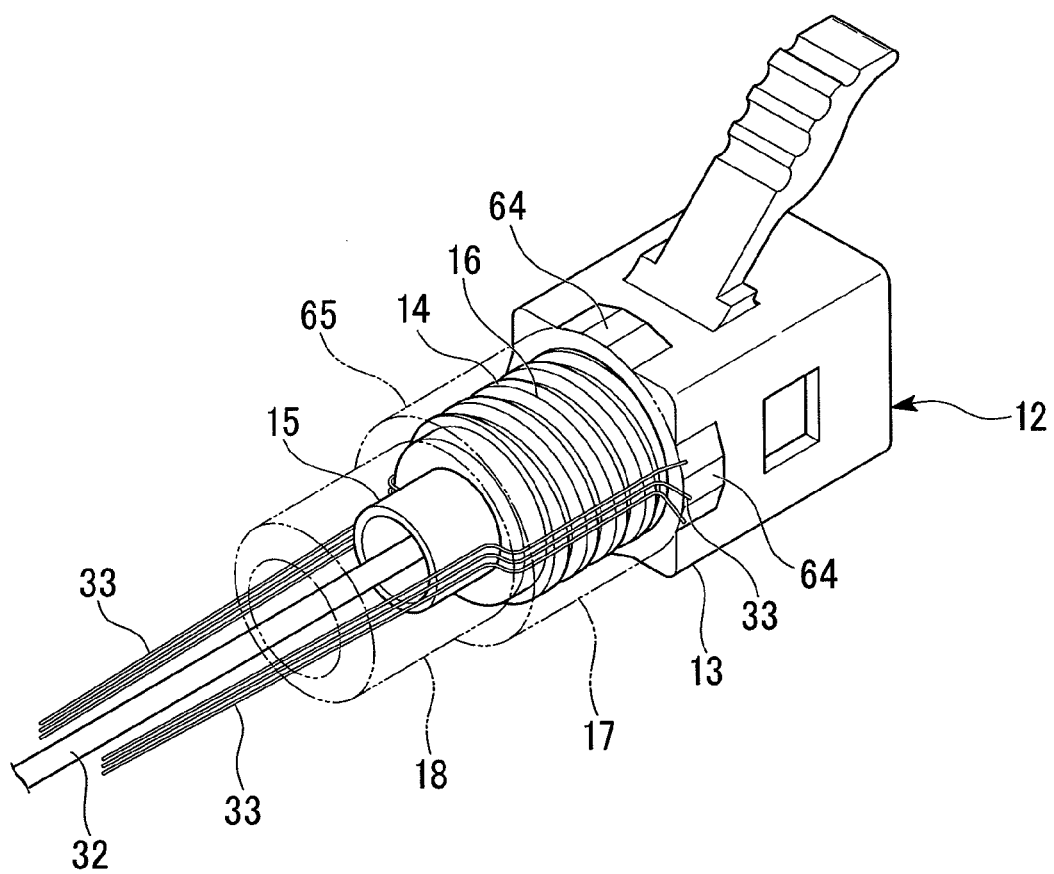
FIG. 29 is a schematic perspective view showing a state where tension bodies are fixed to the optical connector shown in the previous drawing.

As shown in FIGS. 28 and 29, the mounting portion 17 of the fixing cap 65 is screwed onto the fixing portion 14 for the assembly of the optical connector. In this case, the tension bodies 33 are disposed on the outer periphery of the fixing portion 14 and are interposed between the fixing cap 65 and the fixing portion 14 by the screwing of the fixing cap 65 (see FIG. 15).

It is preferable that the tension bodies 33 be interposed between the fixing cap 65 and the fixing portion 14 while being aggregated in the shape of a bundle as shown in FIG. 29. The tension bodies 33 may be divided into a plurality of bundle-like aggregates and fixed to the positions distant from each other in the circumferential direction of the fixing cap 65 and the fixing portion 14. In the embodiment shown in the drawings, the tension bodies 33 have been divided into two aggregates and tied in two bundles, and the bundles have been fixed at positions that are rotationally symmetrical to each other with respect to the axis of the fixing portion 14 and the fixing cap 65. However, the tension bodies 33 are not limited to two aggregates and may be divided into three or more aggregates. It is preferable that the tension bodies 33 be interposed between the base 13 of the stop ring main body 12a and the front end surface of the fixing cap 65.

If the tension bodies 33 are aggregated in the shape of a bundle, the diameter (the diameter of the aggregate) is increased. Accordingly, the tension bodies are interposed between the base 13 of the stop ring main body 12a and the front end surface of the fixing cap 65 with a strong force, so that it may be possible to increase the fixing strength of the tension bodies 33.

Further, it may be possible to reduce the imbalance of forces, which are applied to the stop ring main body 12a and the fixing cap 65 by the tension bodies 33, by fixing the plurality of aggregates at positions that are distant from each other in the circumferential direction.

Meanwhile, tension applied to the tension bodies is shared and received between the fixing cap 65 and the fixing portion 14 (the screw portion 16) and between the peripheral end surface of the fixing cap 65 and the base 13.

Since the swollen convex portions 64 are formed at the base 13 of the stop ring main body 12a, the area of the portions of the base facing the fixing cap 65 is increased. Accordingly, it may be possible to increase the fixing strength of the tension bodies 33 that are interposed between the base and the fixing cap.

During the screwing, the operational convex portion 67 runs on the rising convex portion 63 by the rotation of the fixing cap 65 (see FIGS. 18 and 25) and reaches the position, where the rising convex portion 63 is not formed, by the further rotation of the fixing cap. Since an operational feeling (click feeling) is provided to a user that operates the fixing cap 65 when the operational convex portion 67 falls from the rising convex portion 63, a user can easily confirm the amount the fixing cap 65 was screwed on.

A method of making an optical fiber be abutted and connected to an optical fiber between the pair of elements of the clamping portion (a mechanical splicing method) has been employed in the embodiment shown in the drawings. However, other methods may be employed in the connection of an optical fiber in the present invention. For example, a built-in optical fiber and an optical fiber exposed to a terminal of an optical fiber cable may be fusion-spliced to each other. In this case, a fusion-spliced portion may be reinforced by a reinforcing sleeve and received in the housing.

Further, in the embodiment shown in the drawings, the built-in optical fiber and the optical fiber of the optical fiber cable have been connected to each other inside the optical connector. However, the present invention may be applied to an optical connector having a structure without the built-in optical fiber, that is, a structure where the tip of the optical fiber exposed to the terminal of the optical fiber cable is exposed to the connecting end surface as it is.

Furthermore, the housing 2 has included the elastic pieces 11b and 12b as shown in FIG. 2. However, the housing is not limited thereto, and a housing without elastic pieces may be employed.

INDUSTRIAL APPLICABILITY

According to the present invention, it is possible to provide a site assembly-type optical connector that can be assembled without using a dedicated tool in a site other than a factory, and a method of assembling the optical connector.

The invention claimed is:

1. An optical connector that is assembled onto a terminal of an optical fiber cable where an optical fiber and tension bodies extending in a longitudinal direction of the optical fiber are integrated, the optical connector comprising:
    a housing;
    a ferrule that is provided in the housing; and
    a fixing cap that is mounted on the housing,
    wherein the housing includes a fixing portion of which an outer peripheral surface is provided with a screw portion, and
    wherein while the tension bodies leading from the terminal of the optical fiber cable are interposed between the screw portion of the housing and the fixing cap, the fixing cap is screwed onto and fixed to the fixing portion.

2. The optical connector according to claim 1,
    wherein a built-in optical fiber inserted into the ferrule is connected to the optical fiber exposed to the terminal of the optical fiber cable.

3. The optical connector according to claim 1,
    wherein one or a plurality of groove portions for receiving the tension bodies is formed on the outer peripheral surface of the fixing portion.

4. The optical connector according to claim 3,
    wherein the plurality of groove portions is formed, and the groove portions are formed at positions that are rotationally symmetrical to each other with respect to an insertion direction of the optical fiber.

5. The optical connector according to claim 1,
    wherein the screw portion is formed on the outer peripheral surface of the fixing portion over an entire circumference of the fixing portion.

6. The optical connector according to claim 1,
    wherein a retaining ring, which retains the tension bodies on the housing before a screwing on of the fixing cap, is mounted on the housing, and
    wherein the retaining ring retains the tension bodies by interposing the tension bodies between the retaining ring and the housing.

7. The optical connector according to claim 6,
    wherein the housing includes an extended cylindrical portion that is thinner than the fixing portion and extends rearward from the fixing portion, and
    wherein the retaining ring retains the tension bodies by interposing the tension bodies between the retaining ring and the extended cylindrical portion.

8. The optical connector according to claim 1,
wherein a protective tube is fixed to a jacket of the optical fiber cable,
wherein the protective tube includes a cylindrical tube main body and a locking protrusion that extends outward from the tube main body, and
wherein the locking protrusion is formed so as to be locked to a locking stepped portion formed on an inner surface of the fixing cap and prevent a rearward movement of the protective tube.

9. The optical connector according to claim 1,
wherein while being divided into a plurality of aggregates, the tension bodies are fixed to positions that are distant from each other in a circumferential direction of the housing.

10. An optical connector that is assembled onto a terminal of an optical fiber cable where an optical fiber and tension bodies extending in a longitudinal direction of the optical fiber are integrated, the optical connector comprising:
a fixing portion which is formed at a rear end of a connector body and of which an outer peripheral surface is provided with a screw portion,
wherein a fixing cap is screwed and fixed to the fixing portion, and
wherein while the tension bodies leading from the terminal of the optical fiber cable are interposed between the screw portion of the connector body and the fixing cap, the fixing cap is screwed onto and fixed to the fixing portion.

11. A method of assembling an optical connector onto a terminal of an optical fiber cable where an optical fiber and tension bodies extending in a longitudinal direction of the optical fiber are integrated, said method comprising:
abutting and connecting the optical fiber exposed to the terminal of the optical fiber cable to a built-in optical fiber inserted into a ferrule that is provided in an optical connector housing, the optical connector housing comprising a fixing portion, the fixing portion having an outer peripheral surface with a screw portion; and
screwing and fixing a fixing cap to the fixing portion, while interposing the tension bodies leading from the terminal of the optical fiber cable between the screw portion of the optical connector housing and the fixing cap, after the abutting and connecting of the optical fibers.

12. The method according to claim 11,
wherein while being interposed between the housing and the fixing cap, the tension bodies are retained by a retaining ring before the screwing on of the fixing cap.

13. The method according to claim 11,
wherein while being divided into a plurality of aggregates, the tension bodies are disposed at positions, which are distant from each other in a circumferential direction of the housing, before the screwing on of the fixing cap.

14. A method of assembling an optical connector onto a terminal of an optical fiber cable where an optical fiber and tension bodies extending in a longitudinal direction of the optical fiber are integrated, said method comprising:
screwing and fixing a fixing cap to an optical connector fixing portion, which is formed at a rear end of a connector body and which has an outer peripheral surface provided with a screw portion, while interposing the tension bodies leading from the terminal of the optical fiber cable between the screw portion of the connector body and the fixing cap.

15. The method according to claim 14,
wherein while being divided into a plurality of aggregates, the tension bodies are disposed at positions, which are distant from each other in a circumferential direction of the optical connector fixing portion, before the screwing on of the fixing cap.

* * * * *